(12) United States Patent
Verbo et al.

(10) Patent No.: US 6,491,355 B1
(45) Date of Patent: Dec. 10, 2002

(54) BOOSTED BRAKING DEVICE WITH PASSIVE SAFETY

(75) Inventors: Ulysse Verbo, Aulnay-sous-Boi (FR); Cédric Leboisne, Paris (FR); Daniel Grech, Le Thillay (FR)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/214,647

(22) PCT Filed: Dec. 21, 1998

(86) PCT No.: PCT/FR98/02813

§ 371 (c)(1),
(2), (4) Date: Jan. 8, 1999

(87) PCT Pub. No.: WO99/32340

PCT Pub. Date: Jul. 1, 1999

(30) Foreign Application Priority Data

Dec. 22, 1997 (FR) .............................................. 97 16221

(51) Int. Cl.[7] .............................. B60T 8/44; F15B 9/10
(52) U.S. Cl. .................. 303/114.3; 91/369.1; 60/547.2
(58) Field of Search ............................. 60/547.1, 547.2; 91/369.1, 376 R; 303/4, 114.3

(56) References Cited

U.S. PATENT DOCUMENTS 5,797,264 A * 8/1998 Verbo et al. ................ 60/547.1

* cited by examiner

*Primary Examiner*—Christopher P. Schwartz
(74) *Attorney, Agent, or Firm*—Leo H McCormick, Jr.; Warren Comstock

(57) ABSTRACT

A boosted braking device for a motor vehicle having a master cylinder (M) and a pneumatic booster (S). The booster (S) has a rigid casting (10) divided by a mobile partition (12) into at least a front chamber (14) and a rear chamber (16). A three-way valve (18) carried by the mobile partition (12) is actuated by a control rod (20) to control the pressure in the rear chamber (16) for operating the master cylinder (M). The casing (10) includes a front shell (24) and a rear shell (26) each of which comprises a radial shoulder (28,30) and being secured together by hooping (40) interconnecting with the shoulders (28,30) of the front shell (24) and rear shell (26). The hooping (40) comprises first (40A) and second (40B) part hoops. The first (40A) and second (40B) part hoops are joined together by at least one locking element (50) which is rendered non-functional when the master cylinder (M) is subjected to substantial stress as a result of a frontal or oblique impact of the vehicle.

6 Claims, 4 Drawing Sheets

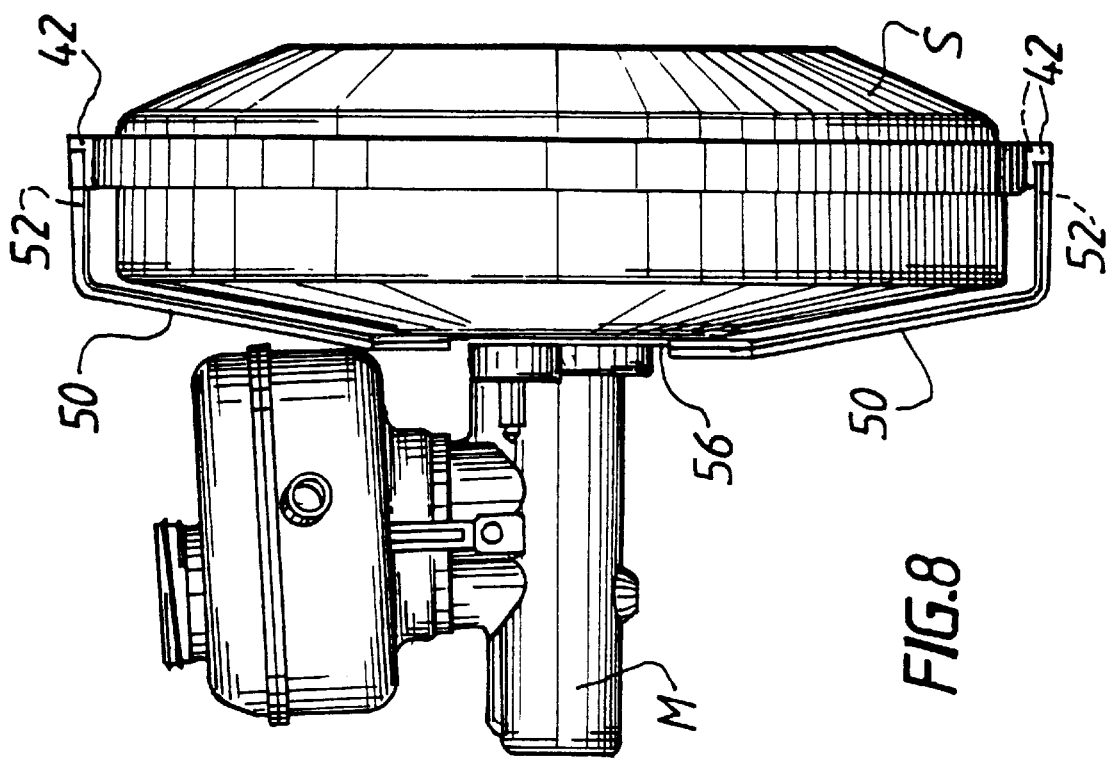
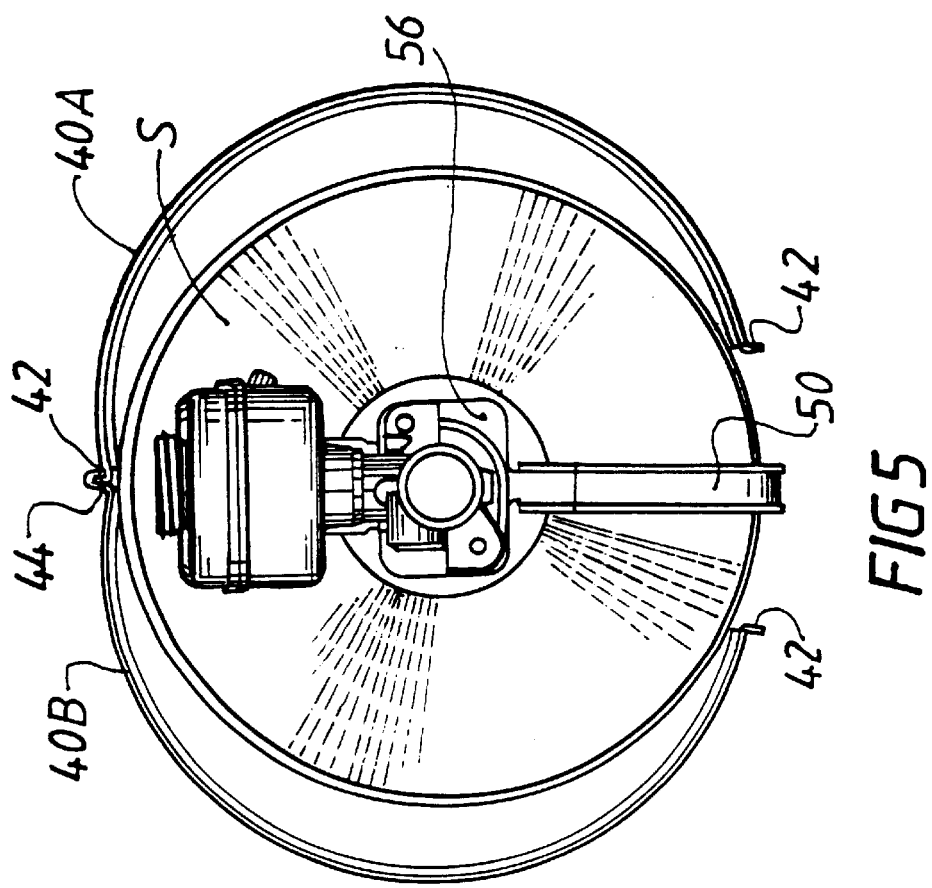

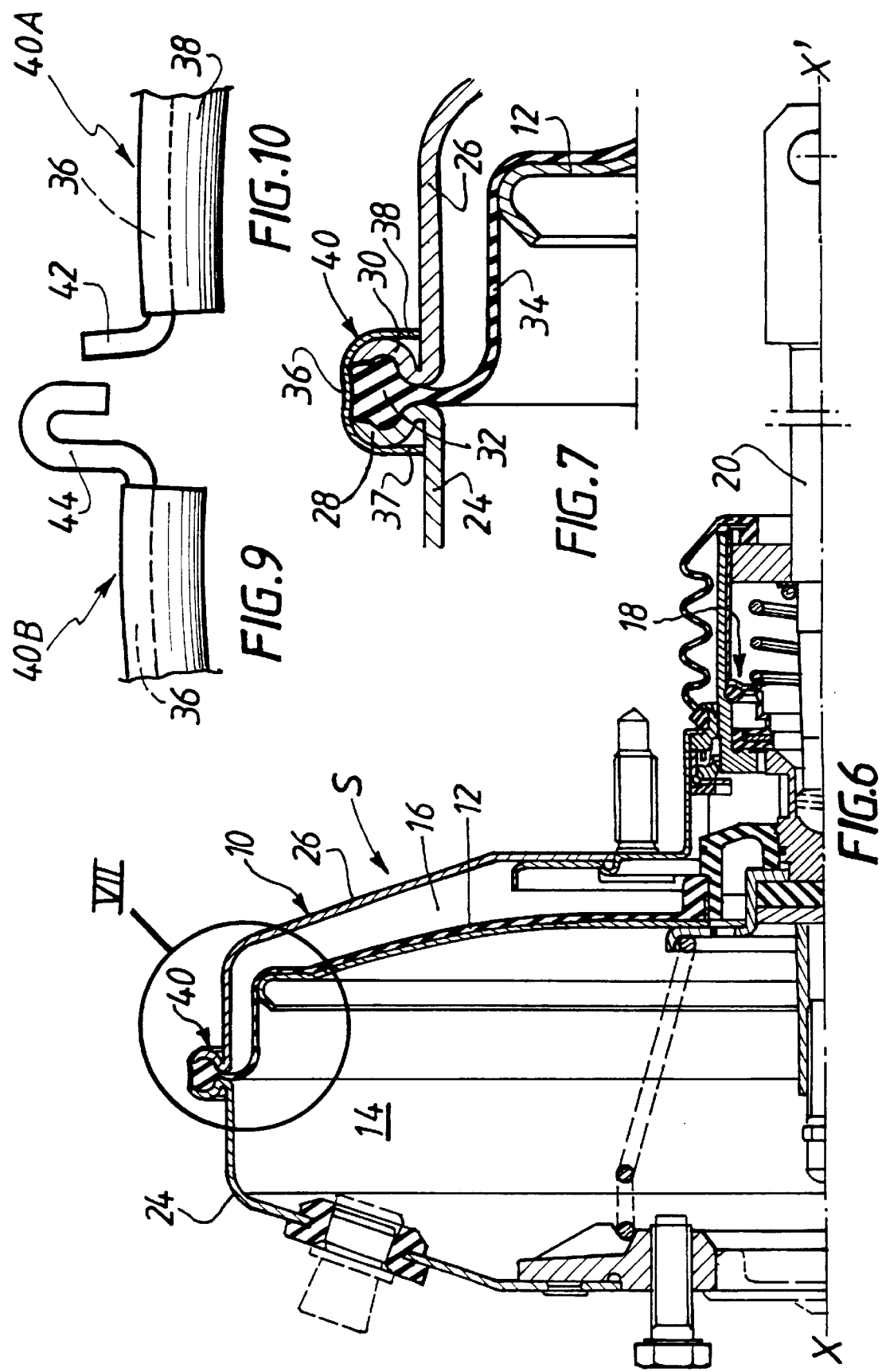

BOOSTED BRAKING DEVICE WITH PASSIVE SAFETY

The present invention relates to a braking device, of the type used to provide the driver of a vehicle with assisted braking.

BACKGROUND OF THE INVENTION

Such braking devices are generally composed of a master cylinder and of a pneumatic booster, the booster comprising, in particular, a rigid casing, a mobile partition delimiting at least a front chamber and a rear chamber, in sealed fashion, inside the casing, a three-way valve that can be actuated by a control rod in order, selectively, to let different pressures into the front chamber and the rear chamber and correspondingly subject the mobile partition to a boost force acting in the direction of the master cylinder, and a push rod connected to the mobile partition for operating the master cylinder, the casing comprising a front shell secured to the master cylinder and forming a wall for the front chamber, and a rear shell forming a wall for the rear chamber, the front shell and rear shell each comprising a radial shoulder, cohesion between the front shell and the rear shell being ensured by hooping interacting with the shoulders of the front shell and rear shell.

Devices of this type are well known in the prior art, as represented, for example, by patent document GB-A-2,136,520. They are usually placed in the front compartment of a motor vehicle, generally containing the vehicle engine, the booster being fixed by its rear wall to the bulkhead that separates this front compartment from the passenger compartment, and the master cylinder being fixed to the front wall of the booster. The booster control rod passes through an opening in the bulkhead and is operated by a brake pedal in the passenger compartment.

Over recent years, a tightening of safety standards has revealed the need for motor vehicle braking devices, and in particular boosters, to evolve in such a way that a frontal or oblique impact applied to the vehicle cannot readily be transmitted to the driver's leg, even if the impact occurs while the driver is depressing the brake pedal as hard as he can.

What happens is that in the event of a frontal or oblique impact of the vehicle with another vehicle or with a stationary obstacle, the structure and bodywork of the vehicle are designed to deform progressively in order to absorb the greatest possible amount of the energy involved in this collision.

It is nonetheless often the case that the engine, or the load being transported in the front compartment of the vehicle, is pushed back under the effect of such a collision, and comes to interfere with the master cylinder. Such interference may result in the application to the master cylinder of a force directed along its axis, or of a force which makes a certain angle with its axis. In all instances, the result is, however, that the master cylinder, via its fixing flanges, urges the casing of the booster back towards the vehicle bulkhead.

It therefore follows that the consequences of a frontal or oblique impact are, on account of the layout of the boosted braking device in the front compartment of the vehicle, first of all that the bulkhead is made to move back under the action of the booster casing, whether or not the booster is equipped with tie bolts, and also that the brake pedal, is made to move back, possibly causing serious injury to the driver of the vehicle. The internal arrangement of this compartment, especially when it contains a vehicle engine, is always practically specific to this vehicle, which means that a solution that can be used successfully in a given vehicle for avoiding the brake pedal being made to move back may prove devoid of any positive effect in some other vehicle.

SUMMARY OF THE INVENTION

The invention falls within this context and its object is to propose a new solution, capable satisfactorily of limiting the transmission of a frontal or oblique impact in configurations where the known solutions do not prove sufficiently effective, by providing a boosted braking device such that interference from the engine or the load being transported in the front compartment of the vehicle with the master cylinder is not converted into the brake pedal being thrown back towards the driver of the vehicle, and which can be achieved without using additional components which would lengthen the axial length of the braking assembly forward of the bulkhead.

To this end, the device of the invention is essentially characterized in that the hooping comprises at least two part hoops, the part hoops being joined together by at least one locking element capable of being rendered non-functional when the master cylinder is subjected to substantial stress as a result of a frontal or oblique impact of the vehicle.

Thanks to this arrangement, the front and rear shells of the booster may, in the event of an impact, become detached from one another without transmitting substantial force towards the driver, the detaching of these two parts even fulfilling the function of absorbing some kinetic energy.

According to a possible embodiment of the invention, the part hoops each comprise, at least at one of their ends, a tab extending radially towards the outside of the booster, the adjacent tabs of two consecutive part hoops being held against one another by the locking device.

For example, the locking device comprises a fork formed at one end of a rigid bar, the other end of which is secured to the front shell of the booster.

In an advantageous arrangement, the end of the rigid bar is secured to a plate itself secured to the front shell of the booster.

In this case, the plate may be inserted between the front shell of the booster and a fixing flange of the master cylinder.

Provision may also be made for the end of at least one of the part hoops to be formed with a tab forming a hook intended to interact with a tab of the adjacent part hoop and extending radially towards the outside of the booster.

Other objects, features and advantages of the invention will emerge clearly from the description thereof given hereafter by way of non-limiting indication with reference to the appended drawings.

BRIEF DESCRIPTION OF THE DRAWINGS

FIG. 5 is a front view of the braking device of FIG. 1, in its configuration after a frontal or oblique impact;

FIG. 6 is a half cross-section of the braking device of FIG. 1;

FIG. 7 is a cross-section on a larger scale of the detail circled VII in FIG. 6, showing the fixing system;

FIG. 8 is a perspective side view of an alternative embodiment of the braking device in accordance with the present invention, and FIGS. 9 and 10 are side views of the ends of the fixing system depicted in FIG. 7.

As can be clearly seen in the figures, the invention relates to a boosted braking device composed of a master cylinder M and of a pneumatic booster S.

Figure 1:
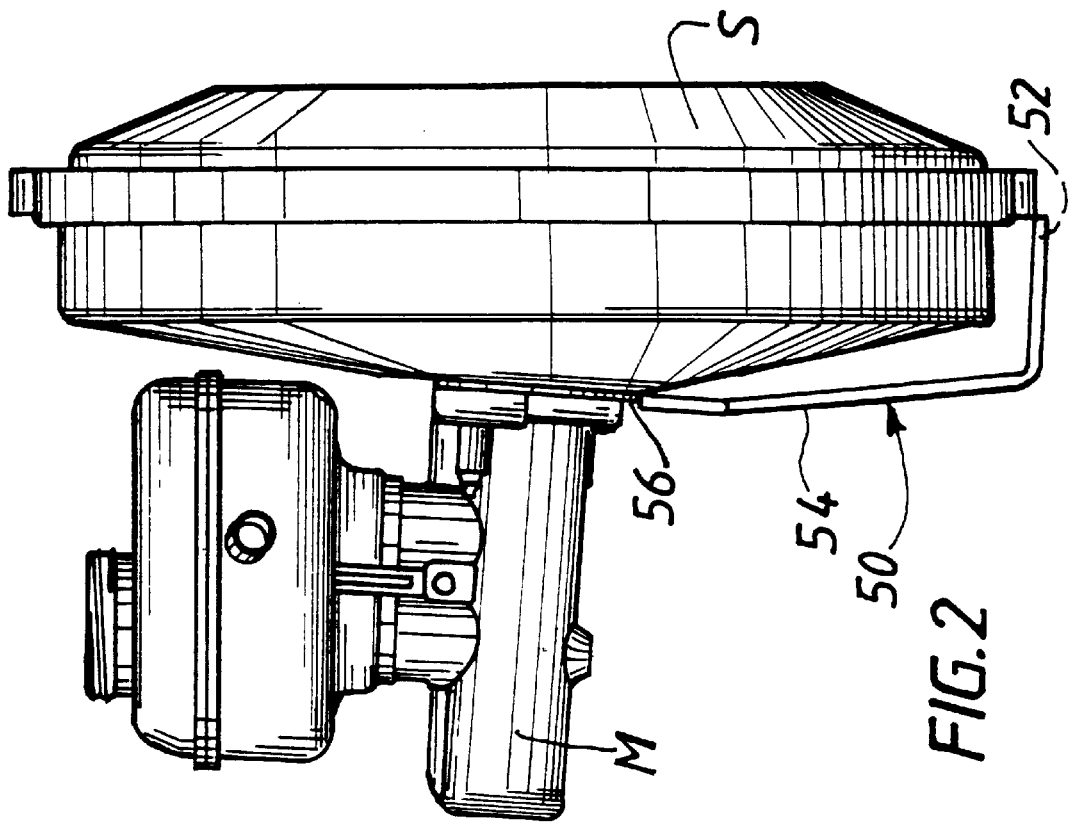
FIG. 1 is a perspective side view of a braking device in accordance with the invention, in its rest configuration.
Figure 2:
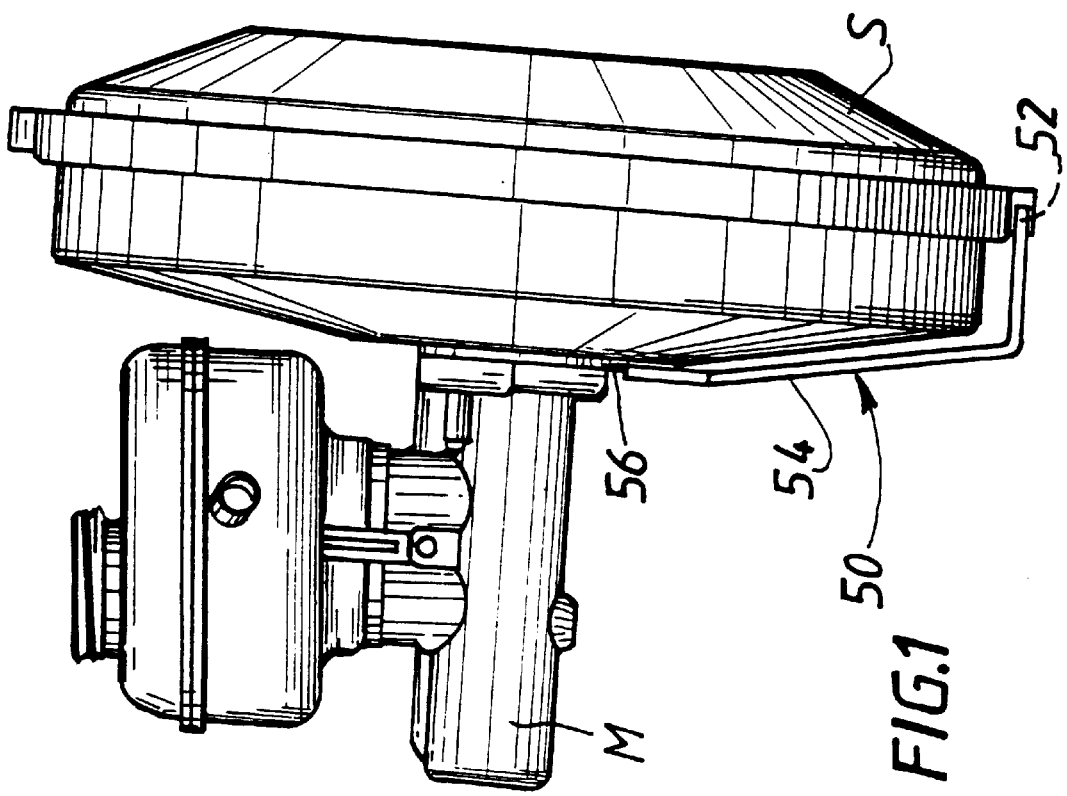
FIG. 2 is a perspective side view of the braking device of FIG. 1, in its configuration after a frontal or oblique impact.
Figure 4:
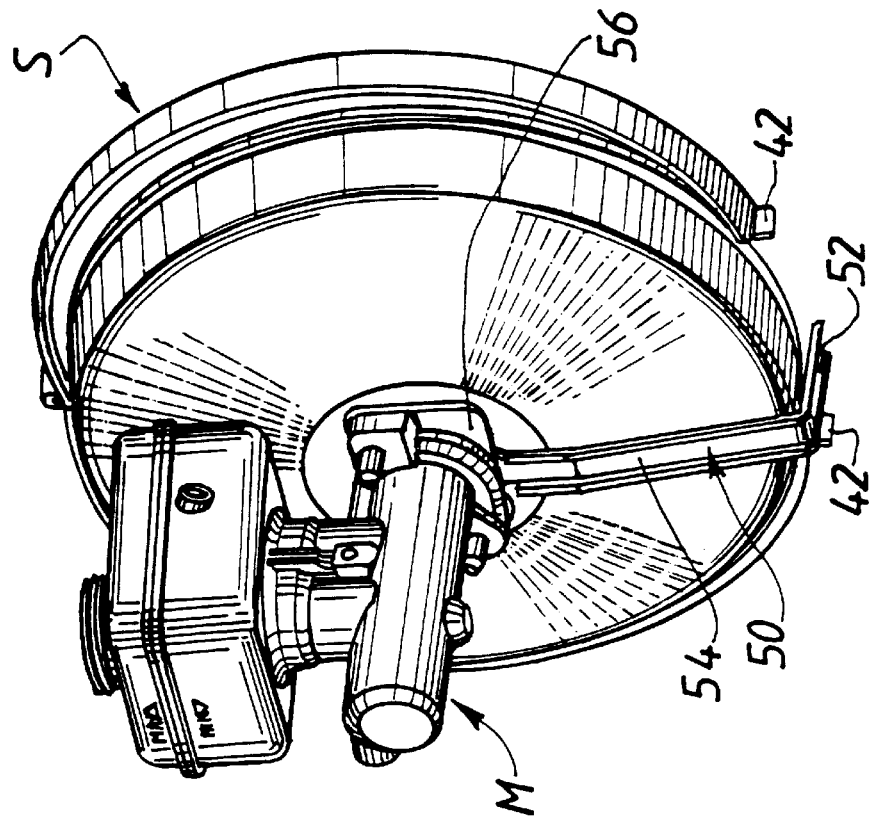
FIG. 4 is a three-quarters front perspective view of the braking device of FIG. 1, in its configuration after a frontal or oblique impact.
Figure 3:
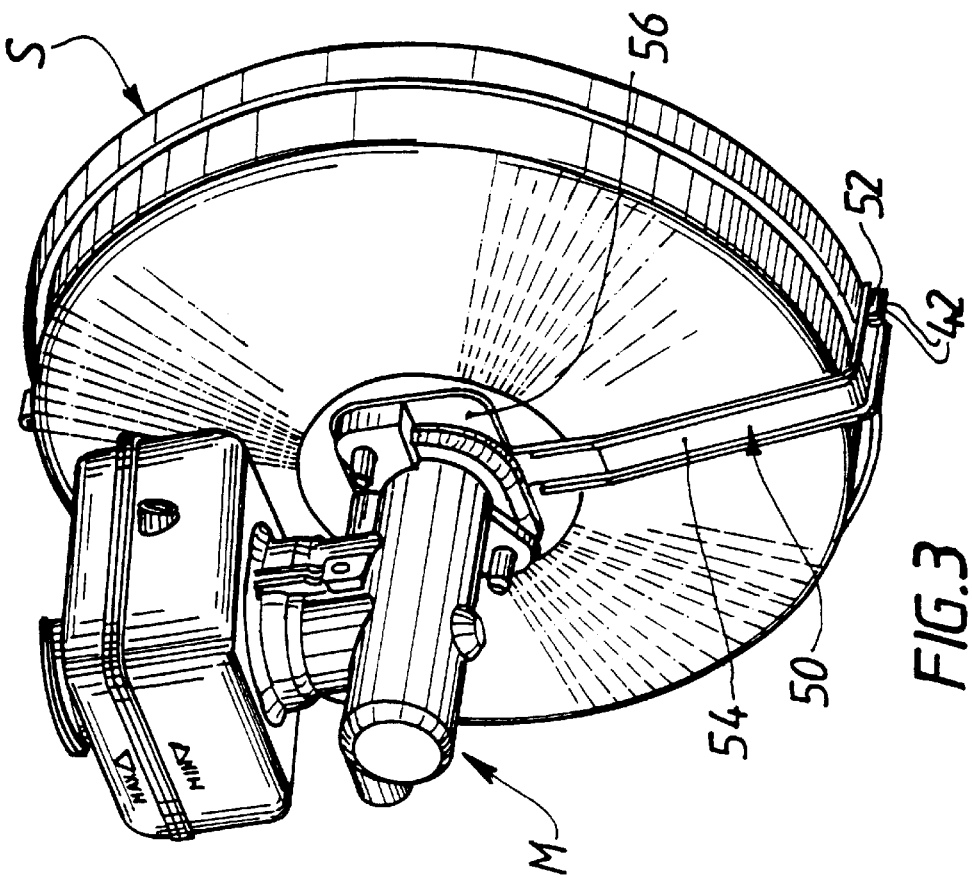
FIG. 3 is a three-quarters front perspective view of the braking device of FIG. 1, in its rest configuration.

By convention, that part of the braking device which faces towards the master cylinder M is called the "front" and that part of this braking device which faces towards the brake pedal is termed the "rear". In FIGS. 1 to 4 and 6 to 8, the front is thus to the left and the rear to the right.

As the way in which these boosted braking devices operate has been well known to those skilled in the art for many years, the present invention will confine itself to summarizing, as a reminder, the structure of the booster to which the present invention applies.

As best seen particularly in FIG. 6, the booster S comprises, in particular, a rigid casing 10, a mobile partition 12 delimiting, in sealed fashion, at least a front chamber 14 and a rear chamber 16 inside the casing 10, a three-way valve 18 that can be actuated by a control rod 20 in order, selectively, to let different pressures into the front chamber 14 and the rear chamber 16 and correspondingly subject the mobile partition 12 to a boost force directed forwards, and a push rod 22 connected to the mobile partition 12 for operating the master cylinder M.

The rigid casing 10 itself comprises a front shell 24, also known as a cylinder, secured to the master cylinder M and forming a wall for the front chamber 14, and a rear shell 26, also known as a cover, forming a wall for the rear chamber 16. In a known way, the front shell 24 and the rear shell 26 are each formed with a radial shoulder 28, 30 respectively, are used to immobilize an outer peripheral bead 32 of a flexible rolling membrane 34 associated with the mobile partition 12.

DETAILED DESCRIPTION OF THE INVENTION

As can best be seen in FIG. 7, circular hooping 40 keeps the front shell 24 and the rear shell 26 clamped tightly together via the shoulders 28 and 30 which hold the bead 32 between them. The hooping 40 is formed of a ring 36, the edges 37 and 38 of which are turned inwards so as to form flanks which extend in mutually parallel planes perpendicular to the axis of symmetry X–X' of the booster.

In accordance with the present invention, the circular hooping 40 consists of two semicircular half hoops 40A and 40B. The ends of each half hoop are shaped in such a way that the ring 36 protrudes from the flanks 37 and 38 by a predetermined length. What is more, this additional length of the ring 36 is bent in such a way that it extends radially with respect to the centre of curvature of the ring 36 and thus forms a tab 42, as has been depicted in FIG. 10.

One of the half hoops, for example the half hoop 40A, is formed with a tab 42 at each of its ends. The other half hoop, for example the half hoop 40B is formed with a tab 42, as has just been described, at one of its ends, while the other end is formed with a tab 44 which is shaped differently. The additional length of the ring 36 is about twice as long as is needed to form a tab 42. This additional length is bent, as before, radially with respect to the centre of curvature of the ring 36, and then is bent over on itself, at 180 degrees so as to form the second branch of a hook, as has been depicted in FIG. 9, the two branches being more or less parallel and leaving between them a gap which is slightly wider than the thickness of the ring 36.

When the booster is assembled, the front shell 24 and the rear shell 26 are arranged facing one another so as to trap the annular bead 32 between their shoulders 28 and 30. The half hoops 40A and 40B can then be installed on the shoulders 28 and 30 in such a way that the tab 44 of the half hoop 40B hooks over the tab 42 of the half hoop 40A. The other ends of the half hoops 40A and 40B, each of which is equipped with a tab 42, can then be brought closer together to hold the booster together.

The tabs 42 are then kept in contact by means of a locking element 50. This locking element 50 comprises a fork 52, gripping the tabs 42 of the half hoops 40A and 40B, and formed at a bent-over end of a rigid bar 54, the other end of which is secured to a plate 56, held on the front shell 24 and, for example, sandwiched between the front shell 24 and the master cylinder M.

The boosted braking device thus assembled can then be installed on a vehicle, and in particular by fixing the rear shell 26 to the bulkhead that separates the engine compartment from the passenger compartment of this vehicle. The boosted braking device therefore finds itself in the configuration depicted in FIGS. 1 and 3. It will thus be understood that in such an arrangement, which is the most common used, the booster and the master cylinder lie one in line with the other, and that the result of this is that the master cylinder forms a projection perpendicular to the bulkhead and the front end of which lies an appreciable distance from the bulkhead.

It will therefore be appreciated that this end is all the more likely, in the event of the vehicle being involved in a collision, to be struck violently by part of the engine or by some of the load being transported in the front compartment.

An impact of this kind is then transferred in full by the body of the master cylinder to the casing 10 of the booster, and by the latter to the bulkhead, and furthermore by their internal components to the booster control rod and finally to the brake pedal.

It will have been understood from reading the foregoing, how the present invention avoids this drawback.

In the event of a frontal or oblique impact of the vehicle equipped with such a boosted braking device, the force generated by part of the engine or some of the load being transported in the front compartment coming to interfere with the master cylinder M will have the first consequence of applying a torque to the body of the master cylinder M, and of making the latter turn about an axis of rotation lying more or less in the region of the flange attaching the master cylinder to the front shell of the booster and to the plate 56 of the locking element 50.

This rotation of the master cylinder with respect to the booster causes a rotation of the plate 56, which in turn causes the locking element 50 to rotate. In this movement, the fork 52 disengages from the tabs 42, which means that the ends of the half hoops 40A and 40B become detached from one another, as has been depicted in FIGS. 2, 4 and 5, and that the half hoops 40A and 40B become held together merely by the tab 42 of the half hoop 40A held in the tab 44 of the half hoop 40B. The half hoops 40A and 40B are free to turn about this articulation, and the result is that the front shell 24 and the rear shell 26 of the booster have also become detached from one another.

A simultaneous consequence of the rotation of the master cylinder with respect to the front shell of the booster has been to break the seal between the front chamber 14 of the booster and the surrounding atmosphere. This therefore means that atmospheric pressure no longer exerts any force which might cause the booster to hold together. The front shell 24 and rear shell 26 are therefore free to separate from one another, and it follows that they are no longer able to transmit any substantial force to the driver of the vehicle.

FIG. 8 depicts an alternative form of the embodiment just described. In this alternative form, the two half hoops which secure the shells of the booster together are identical, and both comprise at their ends tabs such as the tab 42 described earlier. The two half hoops are held by two diametrically opposed locking elements 50 secured to the same plate 56. The behaviour of the boosted braking device produced according to this alternative form is identical to that described earlier, the exception being that the rotation of the master cylinder with respect to the booster may occur in two favoured directions to result in the detachment of the booster.

There has therefore indeed been produced a boosted braking device such that interference from the engine or from the load being transported in the front compartment of the vehicle with the master cylinder will be converted into a detachment of the booster, which means that the latter can no longer transmit a force resulting from a frontal or oblique impact to the driver of the vehicle.

Of course, the invention is not limited to the embodiments which have been described, but can, on the contrary, be modified in numerous ways which will be obvious to a person skilled in the art. Of course, use may be made of part hoops of which there are more than two, for example three part hoops each covering an angular sector of 120 degrees, two consecutive part hoops being joined together by a locking element secured to the plate inserted between the booster and the master cylinder.

What is claimed is:

1. A boosted braking device for motor vehicles consisting of a master cylinder and a pneumatic booster, said booster having a rigid casing, a mobile partition for delimiting and sealing at least a front chamber from a rear chamber inside of said casing, a three-way valve actuated by a control rod to selectively allow different pressures in said front and rear chambers and correspondingly subject said mobile partition to a boost force which acts in the direction of said master cylinder, and a push rod connected to said mobile partition for supplying said master cylinder with an operating input, said casing comprising a front shell secured to said master cylinder and forming a first wall for said front chamber, and a rear shell forming a second wall for said rear chamber, said front shell having a first radial shoulder and said rear shell having a second radial shoulder with cohesion between said front and rear shells being achieved by hooping interaction with said first and second radial shoulders, said hooping being characterized by at least first and second part hoops being joined together by at least one locking element which is rendered non-functional when said master cylinder is subjected to substantial stress as a result of a frontal or oblique impact of the vehicle.

2. The boosted braking device according to claim 1, characterized in that said first part hoop has a first end with a first tab which extends radially toward the outside of the booster and said second part hoop has a second end with a second tab which extends radially toward the outside of the booster, said first and second tabs being held against each other by said locking device.

3. The boosted braking device according to claim 2, characterized in that said locking device comprises a fork formed on a first end of a rigid bar with a second of the rigid bar being secured to said front shell.

4. The boosted braking device according to claim 2, characterized in that said second end is secured to a plate which is secured to the front shell.

5. The boosted braking device according to claim 4, characterized in that said plate is inserted between said front shell and a fixing flange on said master cylinder.

6. The boosted braking device according to claim 1, characterized in that one of said first and second part hoops has a first end formed as a hook and the other of said first and second part hoops has a first end formed as a tab, said hook and tab interacting to join said first ends of said first and second part hoops together.

* * * * *